(12) United States Patent
Boss et al.

(10) Patent No.: US 11,573,626 B2
(45) Date of Patent: Feb. 7, 2023

(54) IDENTIFYING ELECTRICAL POWER PORTS UTILIZING IOT INFORMATION AND AUGMENTED REALITY

(71) Applicant: KYNDRYL, INC., New York, NY (US)

(72) Inventors: Gregory J. Boss, Saginaw, MI (US); Jeremy R. Fox, Georgetown, TX (US); Amit Kapila, Bangalore (IN); Keerthi E K, Bangalore (IN)

(73) Assignee: KYNDRYL, INC., New York, NY (US)

( * ) Notice: Subject to any disclaimer, the term of this patent is extended or adjusted under 35 U.S.C. 154(b) by 786 days.

(21) Appl. No.: 16/445,313

(22) Filed: Jun. 19, 2019

(65) Prior Publication Data

US 2020/0401209 A1 Dec. 24, 2020

(51) Int. Cl.
*G06T 19/00* (2011.01)
*G06F 3/01* (2006.01)
*G06F 1/28* (2006.01)

(52) U.S. Cl.
CPC ............... *G06F 3/011* (2013.01); *G06F 1/28* (2013.01); *G06T 19/006* (2013.01)

(58) Field of Classification Search
CPC . G06F 3/011; G06F 1/28; G06F 1/263; G06T 19/006; H04L 67/12; H04L 67/18; H04L 67/38
See application file for complete search history.

(56) References Cited

U.S. PATENT DOCUMENTS

| | | | |
|---|---|---|---|
| 7,693,702 B1 | 4/2010 | Kerner | |
| 2014/0239733 A1 | 8/2014 | Mach | |
| 2016/0209899 A1 | 7/2016 | Brantner | |
| 2019/0114061 A1* | 4/2019 | Daniels | ............... G06F 3/04847 |

(Continued)

FOREIGN PATENT DOCUMENTS

| CN | 204331328 U | 5/2015 |
|---|---|---|
| CN | 105305179 A | 2/2016 |

(Continued)

OTHER PUBLICATIONS

Apostu, "How Location-Based Augmented Reality Is Creating App Experiences", Updated Nov. 19, 2018, Koombea, 10 pps., <https://www.koombea.com/blog/location-based-augmented-reality-creating-app-experiences/>.

(Continued)

*Primary Examiner* — Chante E Harrison
(74) *Attorney, Agent, or Firm* — Erik Swanson; Andrew M. Calderon; Calderon Safran & Cole P.C.

(57) ABSTRACT

A method for locating an identifying an electrical power port. The method includes one or more computer processors determining that a battery of a first mobile device of a user is less than fully charged. The method further includes identifying one or more Internet-of-Things (IoT)-enabled electrical power ports within a proximity of the first mobile device. The method further includes receiving metadata respectively associated with the one or more IoT-enabled electrical power ports. The method further includes generating one or more augmented reality (AR) elements respectively associated with the one or more IoT-enabled electrical power ports based on the received metadata respectively associated with the one or more IoT-enabled electrical power ports.

20 Claims, 6 Drawing Sheets

(56) References Cited

U.S. PATENT DOCUMENTS

2019/0279425 A1* 9/2019 Yin .................. G06T 19/006
2022/0004672 A1* 1/2022 Santarone ............... G01S 19/48

FOREIGN PATENT DOCUMENTS

| CN | 105514720 A | 4/2016 | |
|---|---|---|---|
| CN | 112118279 A * | 12/2020 | ............. G06F 1/28 |
| WO | 2017099472 A1 | 6/2017 | |
| WO | WO-2019101168 A1 * | 5/2019 | ........... G01R 31/371 |

OTHER PUBLICATIONS

"Disrupting the Hotel Business Through Augmented Reality", by NextReality, Jun. 15, 2018, 3 pps., <https://nextreality.com/2018/06/15/disrupting-the-hotel-business-through-augmented-reality-3/>.

"Mixed Reality and IOT", 2018 Conficio Product Design Ltd., printed from the Internet on Feb. 17, 2018, 9 pps., <https://conficio.design/mixed-reality-and-iot/>.

Yeh, et al., "On-Site Building Information Retrieval by Using Projection-Based Augmented Reality", pp. 342-355, Journal of Computing in Civil Engineering © ASCE / May/Jun. 2012, <https://www.researchgate.net/publication/26486511>.

* cited by examiner

IDENTIFYING ELECTRICAL POWER PORTS UTILIZING IOT INFORMATION AND AUGMENTED REALITY

BACKGROUND OF THE INVENTION

The present invention relates generally to the field of device-to-device communication, and more particularly to utilizing information from Internet-of-Things enabled devices to generate augment reality elements identifying a status and capabilities of electrical power ports within a proximity of a user.

Internet of Things (IoT) is defined as the ability of various physical devices and every-day objects to be connected to each other through the Internet. Embedded with electronics, Internet connectivity, and other forms of hardware (such as sensors), IoT devices can communicate and interact with others over the Internet, wireless network, and other inter-device communication methods such that the IoT devices can provide information and be remotely monitored/controlled. IoT devices can include human-to-device communication. For example, a user utilizes an application on a mobile device to contact IoT beacons of an indoor positioning system to determine the location of the user within a site, and/or to obtain directions to other locations or services within the site, such as elevators, seating areas, etc. In addition, IoT devices can determine information about the surroundings within a proximity of the IoT devices, periodically or in real-time, and store the data for later access by a user.

Augmented reality (AR) is a view of a physical, real-world environment with elements augmented (overlaid) by computer-generated sensory input, such as graphical or haptic information. Generally, augmentation occurs in real-time and in semantic context with various environmental elements. However, augmentation can be applied to captured pictures, snap-shots, or a paused video image obtained by a digital camera of a device, so that the user can review with AR information without rushing or comprising the safety of the user or other people around the user. AR overlays can align virtual information (e.g., shapes, colors, text, links to information, etc.) with the images or video of the physical world. In some examples, virtual information is layered over the physical-world view on a display of a computing device. Various electronic (e.g., computing) devices can include AR capabilities and/or display AR content, such as smartphones, smart glasses, a heads-up display, a digital helmet, etc.

SUMMARY

According to an aspect of the present invention, there is a method, computer program product, and/or system for locating and identifying an electrical power port. In an embodiment, the method includes at least one computer processor determining that a battery respectively associated with at least one electronic device of a user is less than fully charged. The method further includes at least one computer processor identifying one or more Internet-of-Things (IoT)-enabled electrical power ports within a proximity of the user. The method further includes at least one computer processor receiving metadata respectively associated with the one or more IoT-enabled electrical power ports. The method further includes at least one computer processor generating one or more augmented reality (AR) elements respectively associated with the one or more IoT-enabled electrical power ports based on the received metadata respectively associated with the one or more IoT-enabled electrical power ports.

DETAILED DESCRIPTION

Figure 1:
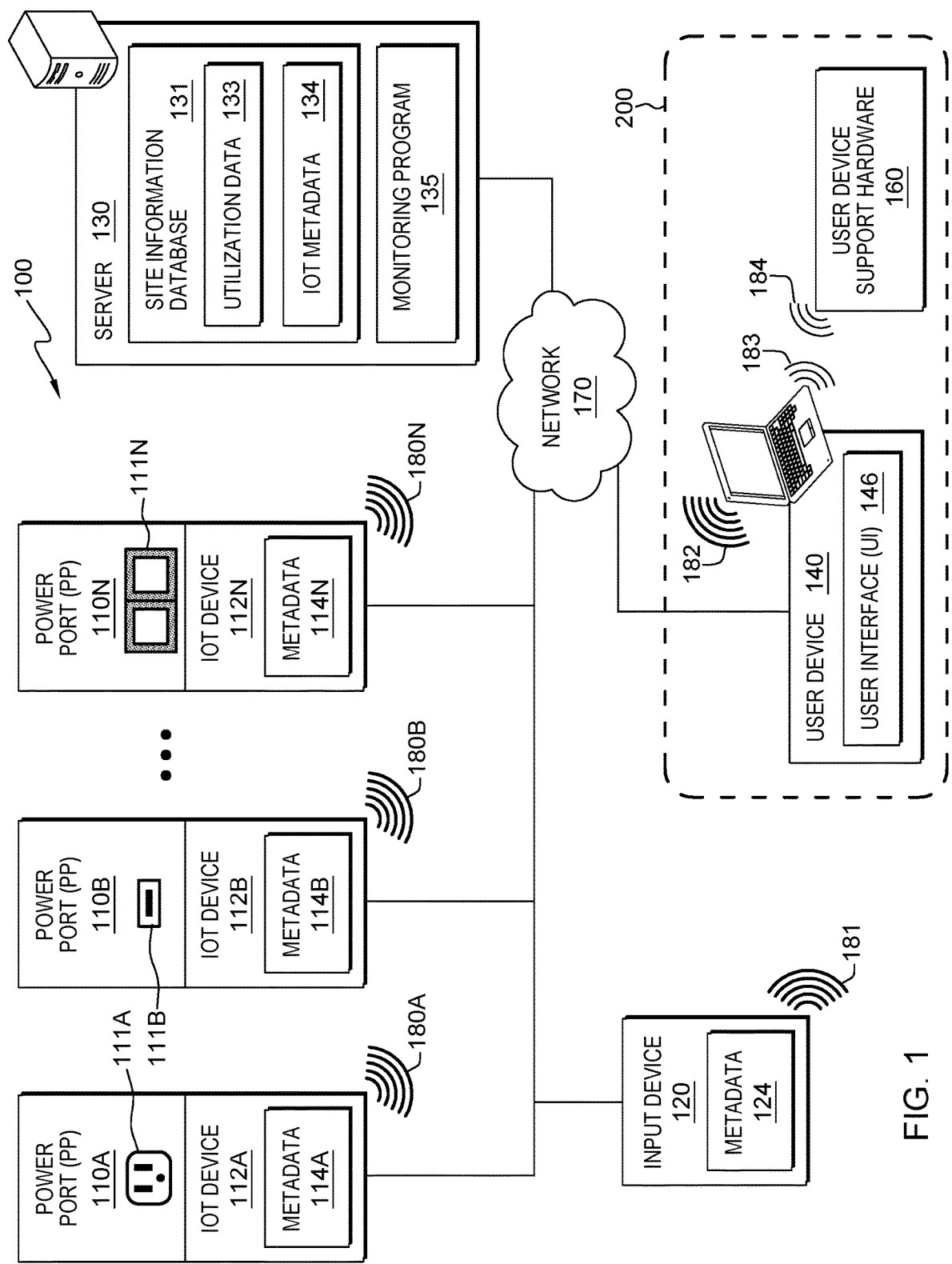
FIG. 1 illustrates a networked-computing environment, in accordance with an embodiment of the present invention.

Embodiments of the present invention recognize that as a user travels for work, pleasure, and/or personal business that the user can travel with various electronic devices, such as a mobile phone, a laptop computer, a music players, an entertainment console, etc. In various situations, one or more electronic devices of a user operate using a battery that is not fully charged, which reduces the duration the electronic device operation and can affect the productivity and/or enjoyment of the user. Embodiments of the present invention recognize that low battery-charge operations can occur while the traveling user is within a site. As referred to herein, a site is a physical location that a user traverses and/or visits (e.g., inhabit) for a period of time, such as waiting for a mode of transportation, avoiding a weather event, or participating in an activity. Examples of stationary public sites include transportation hubs, conference centers, educational institutions, lecture halls, public areas of a business, etc. Examples of mobile public sites include passenger trains, ferries, cruise ships, etc. Private sites may include areas within a business, members-only areas, non-public areas of a government institution, etc.

Embodiments of the present invention recognize that finding and identifying available sources of electrical power (e.g., power outlets, charging ports, etc.), such as alternating current (AC) and/or direct current (DC) to charge one or more electronic devices can become problematic within a site. Embodiments of the present invention recognize that maps, signs, and/or random searching within the site does not guarantee that the user is successful in finding a power source that the user can access and utilize to charge one or more electronic devices of a user.

In addition, embodiments of the present invention recognize that constraints related to power source compatibility, availability of support hardware for an electronic device, and proximity to a compatible power source further complicate the task of charging an electronic device of a user. For example, while a user travels, especially internationally, AC power connections can vary country-to-country and that a user may not have a compatible plug (e.g., type or style) or adapter to access some available AC power outlets. In addition, different electronic devices have differing charging requirements and/or charging capabilities. For example, a laptop computer can charge and operate while connected to an AC power brick. However, a USB™ AC adapter that can operate and charge a smartphone may not generate sufficient power for operating of the laptop computer. The USB™ AC adapter may be limited to trickle-charging the laptop computer due to the lower power output of the USB™ AC adapter and/or the type of power cable utilized by the USB™ AC adapter.

Embodiments of the present invention utilize device-to-device communications and augmented reality (AR) to improve the ability of a user to locate and identify electrical power ports within a site that the user can access to charge one or more electronic devices of the user. Power ports, as used herein, generally refer to sources of AC power, DC power, or a combination thereof, that include one or more sockets or other types of electrical connections to access electrical power. Examples of power ports include power strips; power kiosks; power outlets embedded in various surfaces (e.g., walls, counter tops, tables, columns, floors, etc.); ports between or included within a configuration of seats; etc. Embodiments of the present invention obtain information related to Internet-of-Things (IoT) devices to: identify a status corresponding to a power port, receive metadata related to the capabilities of the power port, and/or determine occupancy information within a proximity of a power port.

In addition, embodiments of the present invention utilize augmented reality (AR) to enhance user experiences and provide information that can affect decisions of a user. AR elements and/or AR content overlays provide graphical and/or text-based information respectively associated with IoT-enabled power ports and/or seating in proximity to an IoT-enabled power port. For example, AR elements and/or AR content overlays visually identify (e.g., highlight) IoT-enabled power ports, indicate a status corresponding to an IoT-enabled power port, and include descriptions of the capabilities of each IoT-enabled power port. Embodiments of the present invention can also include and/or modify AR information presented to a user based on information from sensors, cameras, and/or other IoT-enabled devices of a site to determine whether a seat, location on a bench, or a shared surface (e.g., a table, a countertop, etc.) associated with an IoT-enabled power port is occupied or blocked.

Further embodiments of present invention determine the support hardware (e.g., AC adapters, power cables, communication cables, USB™ AC adapters, etc.), that is with the user and available to a user, required to charge an electronic device. Utilizing information associated with support hardware available to the user, embodiments of the present invention can further include and/or modify the AR content overlays presented to the user indicating seating or other location-based constrains that can affect decisions of the user related to charging an electronic device of the user. Further modifications to AR content and/or AR overlay information are determined in response to the user indicating that two or more electronic devices of the user require charging.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating networked site environment 100, in accordance with embodiments of the present invention. In an embodiment, networked site environment 100 includes a plurality of instances of power port (PP) 110 (e.g., PP 110A through PP 110N), a plurality of instances of input device 120, server 130, and sub-environment 200 interconnected over network 170. In an embodiment, sub-environment 200 (described in further detail with respect to FIG. 2) includes instances of user device 140 connected to network 170 and user device support hardware 160. In some embodiments, sub-environment 200 includes more than one instance of user device 140 and/or user device support hardware 160.

In various embodiments, networked site environment 100 includes a plurality of device-to-device communications, such as wireless communications, respectively associated with one or more elements of networked site environment 100. For example, wireless communication (WC) 180A is respectively associated with IoT device 112A of PP 110A. Instances of WC 181 are respectively associated with instances of input device 120. Similarly, an instance of WC 182 is respectively associated with an instance of user device 140. Wireless communication technologies and protocols may include Bluetooth®, LTE-M, narrowband IoT (NB-IoT), etc. Wireless communication signals within networked site environment 100 may be broadcast continuously, on a periodic basis, generated in response to a ping or polling commands, or a combination thereof based on configuration associated with an electronic device.

Figure 2:
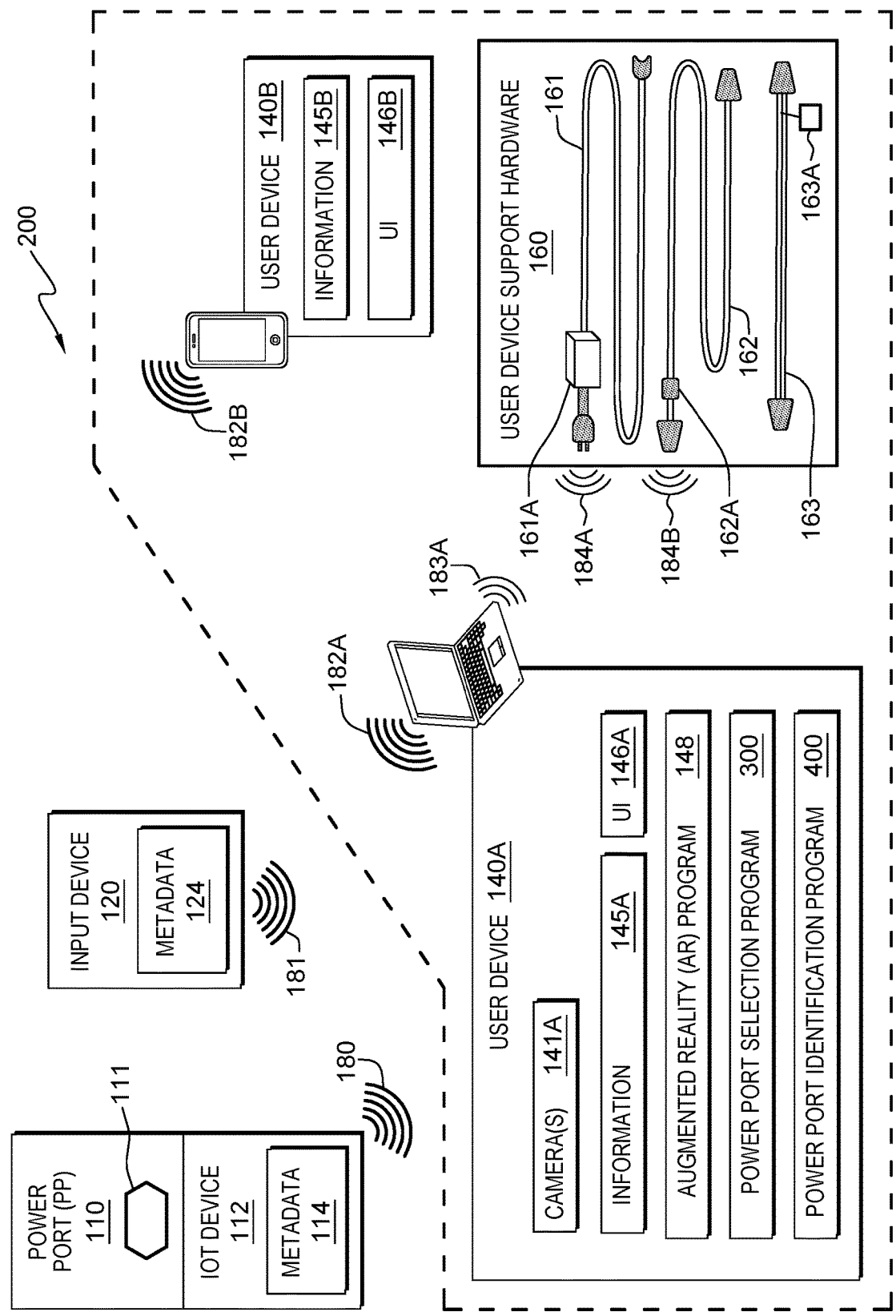
FIG. 2 depicts an illustrative example of a configuration of a mobile device, support hardware for the mobile device and various communication paths utilized by the mobile device to communicate with IoT devices, in accordance with an embodiment of the present invention

In another embodiment, networked site environment 100 includes short-range wireless communications, such as WC 183 and WC 184 within sub-environment 200 between user device 140 and one or more items (e.g., elements) within user device support hardware 160 (discussed in further detail with respect to FIG. 2). Many modifications to the depicted environment may be made by those skilled in the art without departing from the scope of the invention as recited by the claims. Networked site environment 100 may also include wireless-access points (WAPs) (not shown) and/or elements of an IPS associated with network 170.

In an embodiment, PP 110A through PP 110N are representative of a plurality of IoT-enabled power ports (e.g., electrical outlets, mobile device charging stations, etc.) that include respective instances of: power connections (PC) 111 (e.g., elements 111A through 111N), IoT device 112A through IoT device 112N, and metadata 114A through metadata 114N. In an example, PC 111A is representative of an AC power socket; PC 111B is representative of an DC power connection, such as a USB™ connection; and PC 111N is representative of multiple power connections of one or more types of electrical power, such as a quad outlet of MENA 5-15 AC sockets. In a further embodiment, an instance of PC 111 can represent a wireless power transmission technology, such as inductively coupled power transfer or capacitive coupled power transfer.

In some embodiments, some instances of metadata 114 include ID and status information corresponding to respective instances of PP 110. In an example, a status corresponding to an instance of PP 110 may indicate that power is available, power is unavailable, access to power is restricted (e.g., frequent-fliers members only, site personnel, etc.), or power accessible via "pay-for-use". In other embodiments, other instances of metadata 114 corresponding to other instances of PP 110 include additional information related to the capabilities and features (discussed in further detail with respect to metadata 134). In various embodiments, information within the plurality of instances of metadata 114 is aggregated within IoT metadata 134 of site information database 131 included within server 130.

Input device 120 is representative of a plurality of devices distributed within networked site environment 100. In some embodiments, various instances of input device 120 are IoT-enabled devices, such as sensors. In an example, various instances of input device 120 are occupancy sensors that detect the presence of a person or an object that is occupying or blocking access to a seat, countertop, or a portion of a table in proximity to one or more of power port (PP) 110A through PP 110N. Sensor-based instances of input device 120 are based on various technologies, such as electro-mechanical switches, thermal sensors, proximity sensor (e.g., capacitive, inductive, acoustic, optical, etc.), ultrasonic sensors, strain gauges, etc.

In an embodiment, some instances of input device 120 include corresponding instances of metadata 124. IoT-enabled instances of input device 120 can communicate metadata 124 to an instance of user device 140 via respective instances of WC 181. Metadata 124 may include location information related to a corresponding instance of input device 120 and information derived or obtained by the instance of input device 120, such as "this seat is in-use." In various embodiments, information of instances of metadata 124 is aggregated within IoT metadata 134 of site information database 131 included within server 130.

In other embodiments, other instances of input device 120 include non-IoT-enabled devices such as sensors, cameras, elements of an indoor-positioning system (IPS), etc., that interface with server 130 via network 170. Sensor-based instances of input device 120 may include the same type of sensors as IoT-enabled instances of input device 120 and can make similar determinations, such as detecting the presence of a person or object that is occupying or blocking access to a seat, locations on a bench, countertop, or table in proximity to one or more of power port (PP) 110A through PP 110N. In an embodiment, one or more instances of input device 120 are used to determine a location within the site for user device 140.

Server 130 and some instances of user device 140 may be laptop computers, tablet computers, netbook computers, personal computers, desktop computers, personal digital assistants (PDA), smart phones, wearable devices (e.g., smart glasses, smart watches, e-textiles, AR headsets, etc.), or any programmable computer systems known in the art. Wearable computers are especially useful for applications that require more complex computational support than just hardware-coded logics. In an embodiment, other instances of user device 140 include other electronic devices of a user, such as a medical device, a fitness device, a music player, an entertainment console, etc. In certain embodiments, server 130 represents a computer system utilizing clustered computers and components (e.g., database server computers, application server computers, etc.) that act as a single pool of seamless resources when accessed through network 170, as is common in data centers and with cloud-computing applications. In general, server 130 and various instances of user device 140 are representative of any programmable electronic device or combination of programmable electronic devices capable of executing machine readable program instructions and communicating via network 170. Server 130 and instances of user device 140 may include components, as depicted and described in further detail with respect to FIG. 6, in accordance with embodiments of the present invention.

Figure 6:
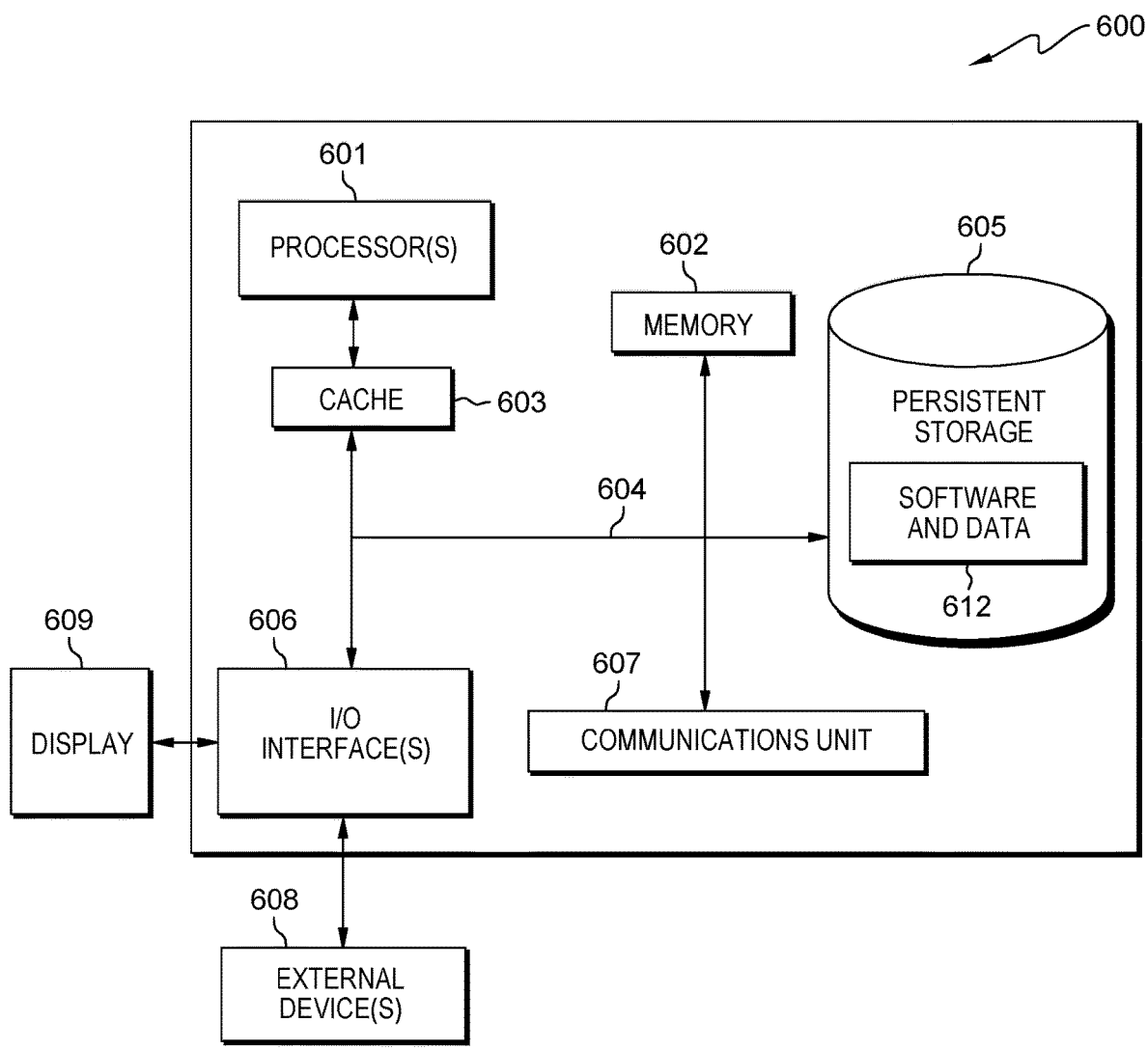
FIG. 6 is a block diagram of components of a computer, in accordance with an embodiment of the present invention.

In an embodiment, IoT device 112A through IoT device 112N may include components, as depicted and described in further detail with respect to FIG. 6, in accordance with embodiments of the present invention. In another embodiment, one or more instances of input device 120 may include components, as depicted and described in further detail with respect to FIG. 6, in accordance with embodiments of the present invention.

Server 130 includes site information database 131 and monitoring program 135. Server 130 may also include various webpages, programs, and databases, such as a facility management program, communication programs, an image recognition program (e.g., a video monitoring program), an IPS program, a wireless signal/device tracking program, an AR program, etc. (not shown). In some embodiments, server 130 hosts versions of power port selection program 300 and power port identification program 400 as a service for users within the site. In an embodiment, server 130 includes a plurality of administrative consoles and displays (not shown) utilized to monitor various aspects of networked site environment 100, such as environmental factors, maintenance activity, occupancy and movement in various areas, physical security, etc. In various embodiments, some programs executing on server 130 interact to control various aspects of networked site environment 100 and physical condition within the site, such as directing maintenance activity; activating/deactivating instances of PP 110; designating some instances of PP 110 as restricted access/utilization or as "pay-for-use" and configuring a rate (e.g., price and duration) for "pay-for-use" instances of PP 110.

Site information database 131 includes utilization data 133 and IoT metadata 134. Site information database 131 may include maps and/or floor plans of a site, geofencing information, and other databases, such as a geotagged image database, a geolocation database linking IoT device ID/locations to the floor plans of the site, etc. (not shown). Site information database 131 may also include a list of users (e.g., members of various privileged groups) that have access to a member-only area or access to a restricted-use instance of PP 110 based on opting-in and/or accepting terms and conditions for access to certain programs and features within networked-site environment 100. In some embodiments, site information database 131 includes more granular information related to a site, such as seating or waiting areas that are restricted for users with particular statuses or needs, such as seating that can accommodate wheelchair access and have priority access to instance of PP 110 for medical devices (e.g., powering and/or charging a portable oxygen generator). In an example embodiment, site information database 131 does not store user movement or location information within long-term storage. User location, movement, seating, and power port utilization information are volatile, expire, and/or are deleted in response to power port selection program 300 and/or power port identification program 400 terminating, or in response to the user leaving the site.

In various embodiments, utilization data 133 includes information received from a plurality of instances of input device 120 and/or a plurality of instances of power ports 110 (e.g., PP 110A through PP 110N) that are "in-use," "available," restricted-use, and/or associated with another status indication. For example, another status indication associated with various instances of PP 110 may be "unavailable" for various reasons, such as physical damage, remotely disabled, or inaccessible because of a physical restriction, a nearby slipping hazard, maintenance activity, etc. In other embodiments, utilization data 133 includes indications of availability corresponding the plurality of seats, locations on a bench, and/or access areas associated with shared surfaces (e.g., tables, countertop, etc.) of one or more areas of the site determined by IoT-enabled instances of input device 120 and/or determined by monitoring program 135 analyzing information from other instance of input device 120 (e.g., occupancy based on image recognition). In example embodiments, utilization data 133 does not include identifying information associated with a user unless the user has opted-in and is utilizing a "pay-for-access" power port.

IoT metadata 134 includes a plurality of metadata associated with the plurality of instances of PP 110, the plurality of instances of input device 120, and various other IoT devices (not shown) within networked site environment 100. In one example, metadata 134 includes an aggregation of metadata 114A through metadata 114N, such as IoT device IDs, location information corresponding to IoT devices, and the capabilities and features for a respective instance of PP 110. Capability and feature information may include: electrical power type(s) AC and/or DC, electrical power connections and/or socket (e.g., standards and types), operational characteristics, and features. Operational characteristics may include voltage, current (i.e., amps (A)), and/or power ratings. For example, 5 VDC 2.4A, 20 VDC 100 watts, 120 VAC 20A, and 220 VAC 10A.

AC electrical power connection standards include: USB™, NEMA, SANS, Cenelec, etc. In an example, instances of PP 110 may be further identified by types, such as NEMA 1-15, NEMA 5-15, CEE 7, etc.; or by a common name familiar to users, such as polarized 2-conductor plug, grounded 3-prong plug, etc. Some DC power connections are based on recognized standards, such as USB™ connections. Similar to AC power, DC power can also vary. For example, common supply voltages of USB™ technologies include: 5-20 VDC variable, 5 VDC, 9 VDC, 15 VDC, and 20 VDC. Similarly, the maximum power generated by a USB™ DC power supply can range from 0.5 watts to 100 watts. Examples of some DC power source/port features include technologies such as, quick charge (e.g., QC 1, QC 2, QC 3, etc.), supercharge, USB™ power delivery (PD), multi-voltage DC auto-detect, etc.

Monitoring program 135 is a program that interfaces with the plurality of instances of PP 110, the plurality of instances of input device 120, and various other IoT devices and/or other sensors (not shown) within networked site environment 100. In an embodiment, one or more aspects of monitoring program 135 are available as a service to user within the site. In another embodiment, monitoring program 135 receives information from and/or periodically polls the plurality of instances of PP 110, the plurality of instances of input device 120, and/or various other IoT devices within networked site environment 100 to obtain, update, and store metadata within IoT metadata 134. Monitoring program 135 also utilizes the received information to update utilization data 133 to identify the instances of PP 110 that are in-use. In another embodiment, monitoring program 135 receives information from the plurality of instances of input device 120 and utilizes one or more programs of server 130 to analyze the information, such as video feed, IPS information, WAP information, etc., to determine occupancy and utilization information that is stored within utilization data 133. In some embodiments, monitoring program 135 determines the location and movement behaviors of users within networked site environment 100, such as a user of user device 140.

In various embodiments, monitoring program 135 generates a web-based version of UI 146 that enables an instance of user device 140 to access utilization information and/or metadata that could not be obtained wirelessly from various instances of PP 110 and/or input device 120. In a further embodiment, a web interface of monitoring program 135 can interface with an AR program (not shown) hosted by server 130 to provide AR elements, overlays and/or images to an instance of user device 140 that does include an AR program; thereby, enabling a user to identify power ports and related seating or shared surfaces within a proximity of the user.

In an embodiment, sub-environment 200 includes one or more instances of user device 140 and respective instances of user interface 146, and an instance of user device support hardware 160. An instance of user device 140 may represent a mobile phone, a laptop computer, a PDA, tablet computer, etc. Other instances of user device 140 may include, but are not limited to a smartwatch, smart glasses, a fitness device, a health monitor, a music player, an entertainment console, etc. In various embodiments, an instance of user device 140 includes additional hardware and software elements (discussed in further detail with respect to sub-environment 200 of FIG. 2). In addition, an instance of user device support hardware 160 may include a plurality of items associated with one or more instances of user device 140 that are discussed in further detail with respect to sub-environment 200 of FIG. 2.

In one embodiment, an instance of UI 146 may be a graphical user interface (GUI) or a web user interface (WUI), and that UI 146 can display images, documents, web browser windows, user options, application interfaces, etc., and include other information, such as graphic, text, and AR content that a program presents to a user. In addition, UI 146 controls sequences/actions that the user employs to execute and/or input information to one or more programs of user device 140 and server 130. In various embodiments, UI 146 displays one or more icons representing applications that a user can execute via network 170, such as a map of the site (not shown).

In some embodiments, a user of an instance of user device 140 can interact with UI 146 via a singular device, such as a touch screen (e.g., display) that performs both input to a GUI/WUI, and as an output device (e.g., a display) presenting a plurality of icons associated with apps and/or images depicting one or more executing software applications (apps). In other embodiments, a software program (e.g., a web browser) can generate UI 146 operating within the GUI environment of user device 140. UI 146 accepts input from a plurality of input/output (I/O) devices (not shown) including, but not limited to, a tactile sensor interface (e.g., a touch screen, a touchpad), a virtual interface device, and/or a natural user interface (e.g., a voice control unit, a motion capture device, an eye tracking, a head-up display etc.). In addition, UI 146 may receive input in response to a user of user device 140 utilizing natural language, such as written words or spoken words that user device 140 identifies as information and/or commands.

In one embodiment, an instance of user device 140 communicates through network 170 to server 130. In another embodiment, a plurality of instances of PP 110 and/or a plurality of instances of input device 120 communicates through network 170 to server 130. Network 170 can be, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, network 170 can be any combination of connections and protocols that will support communications between user device 140, server 130, and/or the Internet (not shown), in accordance with embodiments of the present invention. In various embodiments, network 170 operates locally via wired, wireless, or optical connections and can be any combination of connections and protocols (e.g., personal area network (PAN), near field communication (NFC), laser, infrared, ultrasonic, etc.). In various embodiments, user device 140 utilizes network 170 and/or server 130 to access one or more instances of input device 120 and/or one or more of PP 110A through PP 110N that cannot be accessed wirelessly.

In one embodiment, user device support hardware 160 includes one or more items (discussed in further detail with respect to FIG. 2) that are associated with an instance of user device 140 and are limited to short-range information transfer with an instance of user device 140, as indicated by WC 183 and WC 184. In various embodiments, user device support hardware 160 cannot directly access network 170 or other elements within networked site environment 100. For example, user device 140 can relay information associated with an item within user device support hardware 160 to one or more other portions of networked site environment 100, such as a different instance of user device 140 and/or a program hosted by server 130.

Various embodiments of the present invention can utilize various accessible data sources, such as information 145 or other locations of an instance of user device 140, that may include storage devices and content associated with the user. In example embodiments, instances of power port selection program 300, power port identification program 400, and/or monitoring program 135 allow the user to opt in or opt out of exposing types and categories of information. Instances of power port selection program 300, power port identification program 400, and/or monitoring program 135 enable the authorized and secure handling of user information, such as tracking information, as well as types and categories of information that may have been obtained, is maintained, and/or is accessible. The user can be provided with notice of the collection of types and categories of information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

FIG. 2 is an illustrative example of a portion of networked site environment 100 and additional elements further depicted within sub-environment 200, in accordance with embodiments of the present invention. The illustrative example includes an IoT-enabled instance of PP 110, an IoT-enabled instance of input device 120, user device 140A (e.g., a laptop computer), user device 140B (e.g., a smartphone) and user device support hardware 160. IoT device 112 and input device 120 utilize respective WC 180 and WC 181 to communicate respective metadata 114 and metadata 124 to user device 140A via WC 182A. User device 140B utilizes WC 182B to communicate information 145B, such as a battery charge level to user device 140A. Sub-environment 200 also depicts short-range WC 183 between user device 140A and various items within user support hardware 160 (e.g., WC 184A and WC 184B).

In the illustrative example, PP 110 includes PC 111 and IoT device 112. In some embodiment, PC 111 is representative of two or more power connections included within PP 110, such as a quad AC outlet, an AC outlet and one or more DC power connections, etc. In one example, one outlet of PC 111 may operate at 120 VAC and accept NEMA-type plugs whereas a second outlet may accept a European style electrical plug and operate at 250 VAC. In another example, one USB™ port of PC 111 may be a battery charging connection operating at 5 VDC and 7.5 watts maximum power; whereas, a different USB™ port may be a PD connection operating at 20 VDC and 100 watts maximum power.

In an embodiment, IoT device 112 is capable of controlling and determining various aspects of PP 110, such as activating or deactivating one or more electrical connections of PP 110 and determining whether a user utilizes one or more electrical connections of PC 111. Metadata 114 may include an ID for IoT device 112, a status indicator respectively associated with each electrical connection of PC 111, and capability information for each electrical connection of PC 111.

In the illustrative example, sub-environment 200 includes two instances of user device 140 (e.g., user device 140A and user device 140B) and user device support hardware 160. In an embodiment, user device 140A includes camera(s) 141A, information 145, user interface (UI) 146A, augmented reality (AR) program 148, power port selection program 300, and power port identification program 400. User device 140A may also include a plurality of other programs and data (not shown). Examples of other programs that an instance of user device 140 may include are: device monitoring/control functions, a web browser, an image recognition app, a global positioning system (GPS) program, a social networking app, a voice recognition/natural language processing app, a camera app, etc. User device 140A may communicate with PP 110, input device 120 and/or use device 140B via the same or different instances of WC 182A.

In an embodiment, user device 140B includes information 145B, UI 146B, and a plurality of other programs, apps, and data (not shown). In some embodiments, user device 140B includes one or more other features similar to user device 140A. User device 140B may also include one or more features different from user device 140A.

In one embodiment, an instance of user device 140 is a self-contained, stand-alone computing device, such as a smartphone, a tablet computer, a laptop computer, etc. In another embodiment, other instances of user device 140 may be a component, such as smart glasses, a wearable device, e-textiles, etc., that are wirelessly linked and/or networked to a different instance of user device 140 and/or another computing device, such as server 130. In some embodiments, user device 140B is representative of one or more other electronic devices, such as an AR headset, a digital camera, digital binoculars, a digital projector, etc., that are capable of wirelessly interfacing with user device 140A to perform as an AR device.

An instance of information 145 includes a plurality of information associated with at least a corresponding instance of user device 140, such as a calendar of a user, authentication information, etc. In one embodiment, an instance of information 145 includes user preferences; criteria; and/or events trigger power port selection program 300 to activate, such as a minimum battery charge level warning for user device 140A, a warning based on: calendar information, location information (e.g., GPS position), itinerary data, and/or travel impacts (e.g., weather data, traffic data, etc.). In another embodiment, information within information 145 is obtained from one or more device monitoring/control functions (not shown) of an instance of user device 140. In an example, information 145 may include information associated with user device 140A and user device 140B, such as a level of charge of a battery of a respective device of a user; a rate of battery drain for a given operational level; and/or other respective device information, such as an estimated time to charge to a threshold battery level (e.g., 30 minutes to 50% battery charge and 90 minutes to 100% battery charge).

In another embodiment, an instance of information 145 includes user preferences utilized by AR program 148 and power port identification program 400 with regard to colors, symbols, shading, content information details inclusion, and presentation preferences related to AR elements and AR content overlays rendered within UI 146A. Other user preferences may dictate the quantity of text information displayed within an AR content overlay. Similarly, user preferences associated with AR content may indicate whether displayed text is fully displayed, accessed via scrolling, or the AR content overlay enlarges in response to a user hovering over the AR element, or other methods of display known in the art. In various embodiments, information 145 includes user preferences that define one or more search ranges, visual ranges, or proximity distances associated with locating and identifying power ports for charging instances of user device 140. A proximity determination preference may be modified by the seating or lack of seating or access area near or adjacent to a power port. For example, a user prefers to use shorter power cords (e.g., power cables) in seating areas but is willing to user a longer power cord or cable on a countertop.

In some embodiments, an instance of information 145 includes information (e.g., product specifications) corresponding to items within user support hardware 160, such a length corresponding to cable or power cord; capabilities of a cable, such as operational voltage and maximum power transfer; input and output electrical connection types; and capabilities or features of a power adapter included in or associated with a cable, such as power brick 161A of cable 161. In some scenarios, device 140A and/or power port identification program 400 updates information 145A based on automatically scanning user device support hardware 160 and receiving information associated with a cable via wireless communications. In other scenarios, information within information 145A is determined based on a user of device 140A scanning ID tag 163A of cable 163 or capturing an image of cable 163 and uploading ID tag or image to the Internet and downloading the product specifications related to cable 163. In another scenario, information associated with one or more items within user device support hardware 160 may be manually input by a user to information 145A.

AR program 148 is an augmented reality program that generates AR elements and AR content overlays within a captured picture (still image) or a video feed obtained by a camera within an instance of user device 140 based on information 145 and one or more interactions with power port selection program 300 and power port identification program 400. In one embodiment, AR program 148 applies (e.g., embeds) colored and/or symbol AR elements to viewed seats, locations on a bench, and/or access areas adjacent to or near (e.g., within reach of a user) a shared surface that are associated with one or more power ports. In another embodiment, AR program 148 applies colored, shaded, and/or symbolic AR content overlays respectively associated with power ports within an area viewed by a camera of an instance of user device 140. Various scenarios and examples, of AR elements and content overlays are discussed in further detail with respect to Example FIG. 5. In some embodiments, AR program 148 adds or removes AR elements within the field of view or viewing angle as the context of "within a proximity of a user" changes based on orientation and/or magnification of an image of a site.

In an embodiment, power port selection program 300 is a program executing on a mobile device of a user that identifies the status and capabilities of power ports within the proximity of the user to charge one or more electronic of the user. In various embodiments, power port selection program 300 supplies power port identification program 400 the information associated with the power ports within a proximity of a user. In one embodiment, power port selection program 300 is partially quiesced in the background of an instance of user device 140 and activates in response to detecting one or more criteria, events, or triggers; and alerts the user an electronic device of power ports within a proximity to the user. Power port selection program 300 can determine whether or not to trigger an alert based on one or more criteria or events defined within an instance of information 145 respectively associated with an instance of user device 140. For example, power port selection program 300 alerts a user that one or more power ports are within a proximity of the user in response to determining that user device 140B has a battery charge level of 60% or less.

In another embodiment, power port selection program 300 is initiated by the user to determine whether one or more power ports within a proximity of the user are available and capable of charging an electronic device of the user. In an example, a user may indicate within a user preference to activate power port selection program 300 in response to the user activating camera(s) 141 and scanning (e.g., rotating) through at least a 45-degree arc (e.g., angle). In a different embodiment, power port selection program 300 is a service of a site that executes on server 130, which a user of a mobile device can utilize to obtain status and capability information corresponding to one or more power ports within a proximity of the user.

Power port identification program 400 is a program that utilizes augmented reality (AR) to identify and to provide capability information and status (e.g., availability) information related to power ports within a proximity of a user. In various embodiments, power port identification program 400 utilizes a plurality of information obtained by power port selection program 300 to make various determinations, generate text-based information, and to dictate graphical (e.g., symbolic) references that AR program 148 converts to AR elements (e.g., depictions) and AR content overlays that are applied within a real-time picture or video (e.g., live-video), or to captured or recorded pictures or video for display by UI 146 of an instance of user device 140.

In some embodiments, power port identification program 400 further updates AR content overlays (i.e., text information) based on information 145 for respectively associated with one or more instances of user device 140 and/or information associated with various cables, power bricks, AC adapters, etc., within user device support hardware 160, such as a charging duration for an instance of user device 140 based on utilizing a given instance of PP 110 and an item of user device support hardware 160. In other embodiments, power port identification program 400 further modifies the AR elements depicted to a user via UI 146 based on utilization information associated with other aspects of a site, such as shared surfaces; occupancy of chairs, benches, and/or access areas (e.g., standing room) near or adjacent to shared surfaces.

Still referring to FIG. 2, in the illustrative example user device support hardware 160 includes cable 161, cable 162, and cable 163. User device support hardware 160 may also include a plurality of other components and devices (not shown) utilized by user device 140A and/or user device 140B but not utilized to practice embodiments of the present invention. In an example, other components and devices within user device support hardware 160 can include one or more external persistent storage devices and/or media (e.g., flash memory devices, compact disks (CDs), etc.), a wireless mouse, a headset, etc.

In the illustrative example, cable 161 is a power cord for charging user device 140A and includes power adapter 161A. In an example, power adapter 161A is representative of an AC/DC power converter. In one embodiment, power adapter 161A stores product specifications related to cable 161 and power adapter 161A, such as a length of cable 161, an input AC power plug type, respective AC input supply voltage(s), one or more output DC voltages and related DC current ratings, a DC power connector type, etc. In some embodiments, power adapter 161A is capable of active, short-range wireless communication with user device 140A without being connected to a power port. In the illustrative example, WC 184A is representative of wireless communications associated with power adapter 161A of cable 161. In an example, WC 184A is representative of Bluetooth® Low Energy (BLE) communications.

In the illustrative example, cable 162 is a DC power cord for charging user device 140A or user device 140B that includes identification information within RFID device 162A. In an example, cable 162 is representative of USB™ power deliver (PD) cord. In one scenario, RFID device 162A stores product specifications related to cable 162, such as a length of cable 162, one or more compatible DC input voltages, a maximum power transfer rating, etc. In another scenario, RFID device 162A stores general information related to cable 162, such as an electronic product code (EPC), a serial number, etc. In some scenarios, RFID device 162A is a passive RFID device that transmits stored information via NFC (e.g., WC 184B) in response to device 140A wirelessly scanning (e.g., WC 183A) cable 162. In other scenarios, RFID device 162A is a powered RFID device capable of short-range wireless communication with user device 140A and/or user device 140B. In an example, user device 140A pings cable 162 via WC 183A. In response, RFID device 162A transmits the stored information via WC 184A.

In the illustrative example, cable 163 is representative of a data cable with DC power connections that can charge some instances of user device 140 at a slower rate due to maximum voltage, current, and/or power constraints. In one embodiment, cable 163 is utilized to charge user device 140B via a compatible electrical connection of PC 111. In another embodiment, cable 163 is utilized to charge user device 140B by connecting user device 140B to user device 140A while user device 140A is being supplied power from PP 110 via cable 161 or cable 162. In one scenario, ID tag 163A is an original equipment manufacturer label, a quick response (QR) code, a barcode, etc. In another scenario, ID tag 163A is a user generated tag, label, or QR code. In some embodiments, ID tag 163A is manually scanned to obtain product specifications of cable 163 via the Internet. Subsequently, information 145A is updated with the obtained product specifications.

Figure 3:
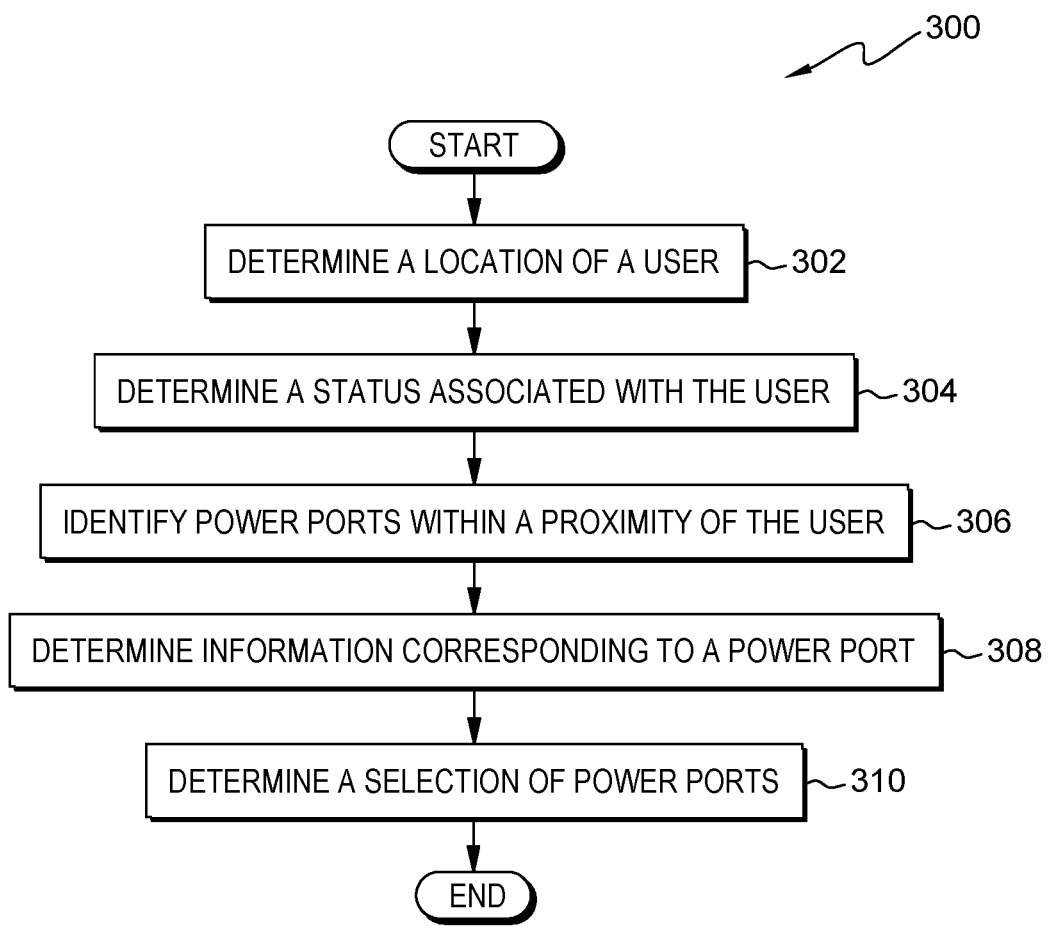
FIG. 3 depicts a flowchart of steps of a power port selection program, in accordance with an embodiment of the present invention.

FIG. 3 is a flowchart depicting operational steps for power port selection program 300, a program for determining a selection of power ports to charge an electronic device of a user based on identifying status and capability information associated with power ports within a proximity of a user, in accordance with embodiments of the present invention. In some embodiments, power port selection program 300 is initiated by a user of an electronic device. In other embodiments, power port selection program 300 is partially quiesced in the background of a device of a user and activates in response to detecting one or more criteria, events, or triggers; and alerts the user an electronic device of power ports within a proximity to the user.

In step 302, power port selection program 300 determines a location of a user. In one embodiment, power port selection program 300 determines a location of a user by accessing a portion of networked site environment 100 and/or interfacing with monitoring program 135 of server 130. In another embodiment, power port selection program 300 determines a location of a user within a site based on GPS coordinates obtained from an instance of user device 140 and a map of the site included in server 130. In some embodiments, power port selection program 300 determines a location of a user relative to one or more instances of PP 110 by analyzing the wireless communications signals transmitted by respective instances of IoT device 112 included within the instances of PP 110, such a via analyses of signal strength and angle-of-arrival of the wireless communication signals transmitted by respective instances of IoT device 112. In various embodiments, power port selection program 300 also determines other movement-based information related to the location of the user, such as speed, pauses, and/or changes of direction.

In step 304, power port selection program 300 determines a status associated with the user. In one embodiment, power port selection program 300 determines a status associated with the user based on motion or location data associated with the user. In one example, if power port selection program 300 determines that the user is moving with pauses of less than a threshold value, then power port selection program 300 infers that the status of the user is "not interested in charging an electronic device." In response, power port selection program 300 can continue to determine the location of the user (step 302). In another example, if power port selection program 300 determines that the user pauses for greater than a threshold value and/or changes direction/orientation (e.g., rotates, scans an area), then power port selection program 300 infers that the status of the user is "interested in charging an electronic device."

In another embodiment, power port selection program 300 determines that a status of a user is "interested in charging an electronic device," based on the user initiating one or more pre-defined actions, activating an app on an instance of user device 140, and/or inputting a command via UI 146, such as raising an instance of user device 140 and activating an instance of camera(s) 141 to capture images or video of an area of the site around the user. In some embodiments, power port selection program 300 determines that a status of a user is "interested in charging an electronic device," based on information within an instance of information 145, such as user preferences, events, triggers, etc., associated with charging an electronic device of the user.

In step 306, power port selection program 300 identifies power ports within a proximity of the user. In one embodiment, power port selection program 300 identifies one or more power ports within a proximity of the user based on receiving (e.g., sniffing) wireless communication signals transmitted by an IoT-enabled power port (e.g., WC 180B of PP 110B). In some embodiments, power port selection program 300 identifies one or more power ports within a proximity of the user by utilizing user device 140 to wirelessly ping, poll, or broadcast an inquiry (e.g., WC 182) to discover IoT-enabled power ports within a proximity of the user. In response, power port selection program 300 identifies whether one or more power ports are in proximity to the user (e.g., an instance of user device 140) based on receiving wireless communication responses (e.g., WC 180A through WC 180N) from corresponding IoT-enabled power ports (e.g., PP 110A through PP 110N) within a proximity of the user.

In other embodiments, power port selection program 300 identifies power ports within a proximity of the user by communicating with server 130. For example, server 130 may utilize a map of the site; one or more features of the site, such as an IPS, WAPs; one or more instances of input device 120; and/or the GPS coordinates obtained from user device 140 and monitoring program 135 to identify one or more instances of PP 110 that are within a proximity of the user. In response, power port selection program 300 receives information via network 170 from monitoring program 135. In various embodiments, power port selection program 300 utilizes a combination of methods to identify power ports within a proximity of the user. In a different embodiment, a version of power port selection program 300 is hosted by server 130 and accesses monitoring program 135 and/or site information database 131 to determine locations of instances of PP 110 that are within a proximity of the user (e.g., user device 140).

In step 308, power port selection program 300 determines information corresponding to a power port. In some embodiments, in response to wirelessly identifying one or more instances of PP 110 (e.g., an IoT-enabled power port) within a proximity of the user, power port selection program 300 also receives corresponding instances of metadata 114 respectively associated with each IoT-enabled power port within a proximity of the user. In some scenarios, power port selection program 300 determines a status, capabilities, location, and/or ID corresponding to a power port based on the received instance of metadata 114. In other scenarios, power port selection program 300 determines a status and ID corresponding to a power port based on the received instance of metadata 114. In response, power port selection program 300 communicates with server 130 to access IoT metadata 134 to determine the capabilities and/or the location of identified power ports within a proximity of the user.

In other embodiments, power port selection program 300 communicates with server 130 to access monitoring program 135 and/or IoT metadata 134 within site information database 131 to determine the statuses, capabilities, IDs, and/or locations of various power ports within a proximity of the user that cannot communicate wirelessly. In different embodiment, a version of power port selection program 300 hosted by server 130 accesses monitoring program 135 and/or IoT metadata 134 within site information database 131 determine the status, capabilities, and/or locations of instances of PP 110 that are within a proximity of the user.

In step 310, power port selection program 300 determines a selection of power ports. Power port selection program 300 may utilize information: within information 145, input via an instance of UI 146, and/or information wirelessly communicated from a different instance of user device 140, to determine the one or more instances of user device 140 that require charging. In one embodiment, power port selection program 300 determines a selection of power ports based on the instance of user device 140 that require charging and metadata corresponding to power ports within a proximity to the user. In another embodiment, power port selection program 300 determines a selection of power ports based on a combination of instances of user device 140 that requires charging and metadata corresponding to power ports within a proximity to the user.

In a different embodiment, a version of power port selection program 300 hosted by server 130 uploads information 145 from an instance of user device 140 and determines a selection of power ports within a proximity of the user based on the one or more of instances of user device 140 that require charging. In a further embodiment, power port selection program 300 further analyzes an instance of information 145 and/or information obtained from user device support hardware 160 to identify constraints that affect the selection of power ports within a proximity of the use. In an example, power port selection program 300 determines the dictated types of PC 111 that are compatible with each AC adapter, AC power brick, or cable within user device support hardware 160 that are utilized for charging an instance of user device 140.

Figure 4:
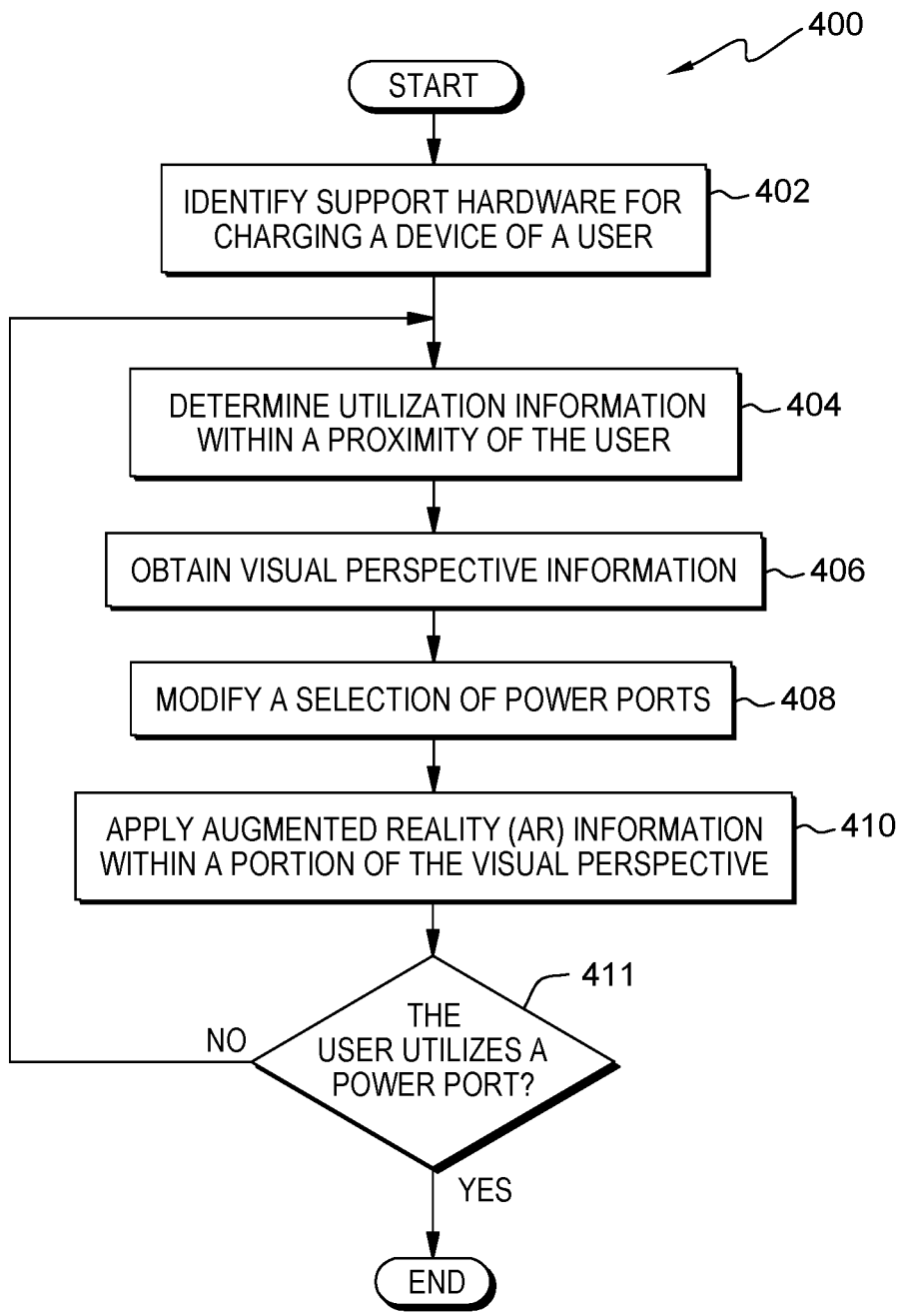
FIG. 4 depicts a flowchart of steps of a power port identification program, in accordance with an embodiment of the present invention.

FIG. 4 is a flowchart depicting operational steps for power port identification program 400, a program that utilizes augmented reality to identify and to provide capability and availability information related to power ports and areas associated with accessing power ports within a proximity of a user, in accordance with embodiments of the present invention. In various embodiments, power port identification program 400 utilizes information determined by power port selection program 300, such as a location of a user, information associated with the user (e.g., preferences), a battery charge status of a device of the user, support hardware available for charging a device of the user, a selection of IoT-enabled power ports and corresponding metadata within a proximity of the user, etc. In some embodiments, power port identification program 400 executes within an electronic device of the user that requires charging. In other embodiments, power port identification program 400 executes within another electronic device of the user. A different embodiment, power port identification program 400 is a service of a site that executes on server 130 that a user of a mobile device can utilize to obtain AR elements respectively associated with power ports within the site within a proximity of the user.

In step 402, power port identification program 400 identifies support hardware for charging a device of a user. For example, power port identification program 400 identifies the capabilities and requirements related to an item of support hardware, such as output voltage output power, and electrical connections types (e.g., power port and user device connections). In one embodiment, power port identification program 400 identifies product specifications corresponding to support hardware for charging a device a user from an instance of information 145. In another embodiments, power port identification program 400 wirelessly communicates with one or more items within user device support hardware 160 to identify product specifications corresponding to support hardware for charging an instance of user device 140.

In some embodiments, power port identification program 400 obtains an ID, RFID information, a barcode, an image, and/or an EPC number for an element of support hardware within user device support hardware 160. In response, power port identification program 400 can access the Internet to obtain the corresponding product specifications of the element of support hardware within user device support hardware 160.

In step 404, power port identification program 400 determines utilization information within a proximity of the user. The context of "within a proximity of a user" may be related to a user preference, a visual range of the user, the resolution or magnification capabilities of an instance of camera(s) 141, and/or the wireless communication range of various electronic devices. In one embodiment, power port identification program 400 determines utilization information within a proximity of the user based on receiving instances of metadata 124 from among the plurality of instances of PP 110 and/or the plurality of instances of input device 120 within the site. In some embodiments, power port identification program 400 utilizes device IDs and other information obtained by power port selection program 300 to access utilization data 133 to determine status/utilization information related to instances of PP 110, seating, shared surfaces, etc., within a proximity of a user. In various embodiments, power port identification program 400 determines utilization information within a proximity of the user based on information obtained from a combination of previously discussed sources.

In step 406, power port identification program 400 obtains a visual perspective. In some embodiments, power port identification program 400 obtains a visual perspective in proximity of the user by utilizing a rear-facing instance of camera(s) 141 of an instance of user device 140. In addition, UI 146 may display the visual perspective captured by the rear-facing instance of camera(s) 141. In an example, power port identification program 400 utilizes the rear-facing instance of camera(s) 141 to obtain a video stream (e.g., near-real time viewing) of a visual perspective based on the orientation of an instance of user device 140. In various embodiments, power port identification program 400 obtains a panoramic visual perspective in response to a user utilizing an instance of user device 140 to scan (e.g., pan, execute and angular/rotational motion) an area around and/or in proximity to the user.

In other embodiments, power port identification program 400 pauses while obtaining the visual perspective (e.g., snap-shot, panoramic view, recorded video, etc.) in proximity of the user. In an example, power port identification program 400 pauses while a visual perspective in proximity to the user is obtained by a user-facing instance of camera(s) 141 (e.g., included within the surface of user device 140 that displays UI 146. In an alternate embodiment, a client version of power port identification program 400 uploads a visual perspective obtained by an instance of camera(s) 141 to server 130 for subsequent analysis.

In step 408, power port identification program 400 modifies a selection of power ports. Modifying a selection of power ports may include modifying information related to previously identified instances of PP 110 and/or information related to seats, locations on a bench, and/or access areas associated with shared surfaces adjacent to or near the identified instances of PP 110. In various embodiments, power port identification program 400 modifies a selection of instances of PP 110 based on information within information 145 related to instances of user device 140 and/or information associated with user device support hardware 160 as previously identified in step 402. In some embodiments, power port identification program 400 modifies a selection of instances of PP 110 based on determining additional information related to selected instances of PP 110 that further describes various aspects of an instance of PP 110 within a proximity of a user. For example, the additional information determined for an instance of PP 110 may include graphical, symbolic, and/or text-based information (e.g., AR elements, AR content overlays) associated with a status and/or information corresponding to an instance of PP 110 or other aspects of a site, such as seating.

In another embodiment, power port identification program 400 modifies a selection of power ports in response to a change in a visual perspective, such as modifying the level of zoom associated with an image or an instance of US 146. For example, some instance of PP 110 visible at a 1.0× magnification would leave the field of view at 2.5× magnification; however, previously unidentifiable instances of PP 110 would be within a visual proximity at the higher magnification. Power port identification program 400 may, based on information received from server 130, modify a selection of power ports and/or information related to the identified instances of PP 110 and/or information related to seats, locations on a bench, and/or access areas associated with shared surfaces adjacent to or near the identified instances of PP 110.

In step 410, power port identification program 400 applies augmented reality (AR) information within a portion of the visual perspective. Examples of AR elements and AR content overlays may include graphical, symbolic and/or text-based information described in further detail with respect to example FIG. 5. In an embodiment, power port identification program 400 utilizes AR program 148 to generate additional AR elements and AR content overlay that are outside the field of view (i.e., visual perspective) of the user of user device 140 and to buffer the additional AR elements for access in response a change in the visual perspective. Similarly, AR elements that leave the visual perspective of the user are stored for reuse if need. In response to the user moving, a second visual perspective AR program 148 deletes one or more AR elements.

In some embodiments, power port identification program 400 utilizes AR program 148 to apply AR elements and AR content overlays corresponding to instances of PP 110 within the visual perspective, such as an image or video displayed via UI 146. In various embodiments, power port identification program 400 utilizes AR program 148 to apply AR elements and AR content overlays to other physical elements within the visual perspective in addition to the plurality of instances of PP 110, such as seats, locations on a bench, and/or access areas adjacent to or near a shared surface that are associated with one or more instances of PP 110.

In decision step 411, power port identification program 400 determines whether the user utilizes a power port. In one embodiment, responsive to determining that the user does not utilize a power port (No Branch, decision step 411), power port identification program 400 loops to step 404 to determine whether a change has occurred to the utilization information within a proximity of the user. In some embodiments, responsive to determining that the user does utilize a power port, port identification program 400 pauses at decision step 411 and awaits additional information from power port selection program 300. For example, if a lack of available power ports occurs within a proximity of a user, the user moves to an area devoid of IoT-enabled power ports, the user moves to another location within the site, and/or the visual perspective changes, then power port identification program 400 pauses at decision step 411 and awaits additional information from power port selection program 300.

In another embodiment, responsive to determining that that the user utilizes a power port (Yes branch, decision step 411), power port identification program 400 terminates. In various embodiments, if two or more instances of user device 140 require charging and the user elects to charge one instance of user device 140, then power port identification program 400 pauses at decision step 411 waiting additional information from power port selection program 300 and/or other inputs from the user. For example, power port identification program 400 pauses at decision step 411 while power port selection program 300 determines whether one or more changes occurs within networked site environment 100 that affects charging another instance of user device 140, such as another user leaves releasing one or more in-use instances of PP 110 and/or allowing the user to switch seats to access other instances of PP 110. In response, power port identification program 400 may alert the user of the changes occurring within networked site environment 100.

Figure 5:
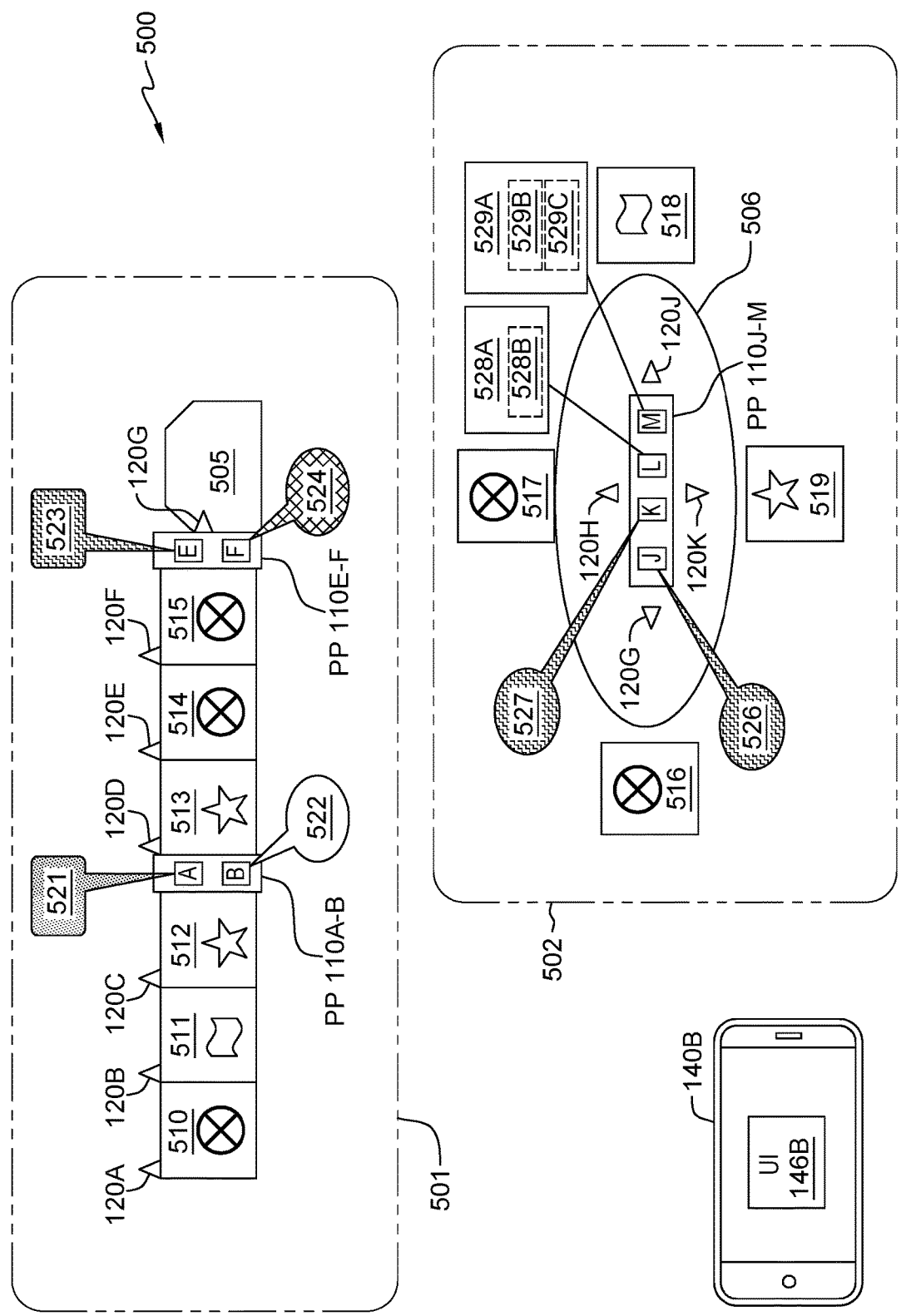
FIG. 5 depicts an illustrative example of an augmented reality view associated charging one or more devices of a user, based on information obtained from a plurality of IoT and IoT-enabled devices, in accordance with an embodiment of the present invention.

FIG. 5 depicts an illustrative example of environment 500, an AR modified view of a portion of a site generated by power port identification program 400 in response to power port selection program 300 determining that one or more electronics devices of the user requires charging. A user of user device 140B views environment 500 via UI 146B. The AR content applied within environment 500 is based on: information obtained from one or more instances of user device 140, information associated with user device support hardware 160, and information wirelessly-obtained from a plurality of IoT and IoT-enabled devices within the portion of the site associated with environment 500, in accordance with embodiments of the present invention.

In the illustrative example, environment 500 includes user device 140B, such as a smartphone, and seating areas 501 and 502. In an embodiment, user device 140B includes UI 146B, a user-facing display and a rear-facing camera (not shown). UI 146B is utilized to display one or more AR elements respectively associated with various physical elements within an image (e.g., a picture or a video feed) of seating areas 501 and 502, as captured by the rear-facing camera. In addition, environment 500 includes a plurality of wireless communication paths (not shown) that transmit metadata from a plurality of IoT-enabled devices, such as power ports and occupancy sensors (e.g., instances of input device 120), to user device 140B.

In the illustrative example, physical elements of seating areas 501 and 502 include a plurality of seats (e.g., seats 510 through 518) and respectively associated instances of input device 120A through 120H, 120J, and 120K that are IoT-enabled occupancy sensors; IoT-enabled power ports (PP 110A through PP 110M); area 505; and public surface 506. In an example, area 505 is representative of a restricted area designated for use by a subset of users that can utilize the site for temporary placement of wheel-chairs, strollers, etc. Input device 120G determines whether area 505 is in use. In one example, public surface 506 is representative of a table and input devices 120G, 120H, 120J, and 120K are mounted underneath the table. In another example, public surface 506 is representative of a countertop, and input devices 120G, 120H, 120J, and 120K may be mounted in the edge and/or on top of public surface 506.

In various embodiments, the plurality of elements of seating areas 501 and 502 include one or more AR elements respectively applied to various physical elements, such as seats and power ports. In the illustrative example, two types of AR elements are depicted. A first type of AR element depicts a symbolic representation associated with each of seats 510 through 518. The first type of AR indicates an occupancy status, or an occupancy consideration associated with a seat. The first type of AR element may be based on shapes, symbols, colors, text, etc.

In an embodiment, an instance of input device 120 respectively associated with a seat determines whether the seat is occupied, blocked, or is otherwise unavailable for use. In one scenario, a circled-X associated with a seat indicates that the respective seat is unavailable to the user of user device 140B. In another scenario, unoccupied seats can be assigned two differing AR indicators: a star symbol or a banner symbol. In an embodiment, an AR star symbol associated with the seat indicates that the user is not constrained with respect to charging one or more instances of user device 140. Whereas, an AR scroll symbol associated with a seat, such as seat 511 indicates that the user can utilize the seat with one or more constraints associated with charging an instance of user device 140. For example, cable 161 of user support hardware 160 (previously discussed with respect to FIG. 2) is of sufficient length to charge user device 140A; however, cable 162 is not of sufficient length to charge user device 140B.

A second type of AR element is an AR content overlay that includes text information in addition to symbolic representation of other information. With respect to seating area 501, the second type of AR element includes oval callouts 522 and 524; and rounded-corner callouts 521 and 523. In one example, with respect to seating area 501, an oval callout indicates a general-use power port (e.g., PP 110B and PP 110F), and a rounded-corner callout indicates a restricted access power port (e.g., PP 110A and PP 110E). In the illustrative example, a fill pattern within a callout graphically indicates status information related to a power port. In an example, a lack of a fill pattern indicates a status of "available," a zig-zag fill pattern indicates a status of "unavailable," a cross-hatch fill pattern indicates a status of "disabled or inoperable," and a speckle fill pattern indicates a status of "pay-for-use."

In an embodiment, each callout (e.g., second type AR element) corresponding to a power port includes text indicating the capabilities of a power port, such as one or more types of electrical power that the power port supplies, one or more corresponding electrical connections or sockets included in the power port, and/or one or more corresponding features respectively associated with an electrical connection included in the power port. In an example, the text information within callout 522 may indicate that PP 110B includes two 120 VAC, 15 amp, NEMA 5-15 sockets; and one 5-20 VDC, 45 watt, USB™ connection with QC3 capabilities.

In the illustrative example, within seating area 502 input devices 120G and 120H determine that seats 516 and 517 are occupied; therefore, power port identification program 400 dictates the AR program 148 apply a circled-X symbol to seats 516 and 517. As previously discussed, a zig-zag fill pattern depicted within oval callouts 526 and 527 indicates that PP 110J and PP 110K are utilized. In addition, seating area 502 depicts another variant (e.g., a rectangular callout) of the second type of AR element that includes additional supplemental text in addition to the text related to capabilities and features of a power port previously discussed with respect to callouts 521 through 524. For example, rectangular callout 528A includes supplemental text 528B, and rectangular callout 529A includes supplemental text 529B and 529C. In some embodiments, the supplemental text information within a callout indicates: one or more effects of utilizing a power port to charge an instance of user device 140, a dictate, and/or a constraint associated with utilizing a power port to charge a particular instance of user device 140 using one or more items within user device support hardware 160 (not shown).

In one scenario, power port identification program 400 determines supplemental text information that is generated for rectangular callouts 528A and 529A (e.g., AR content overlays) based on information 145A and the contents of user support hardware 160 in addition to status and capability information corresponding to PP 110L and PP 110M. In various scenarios, power port identification program 400 infers that PP 110L will be utilized with respect to seat 519 based on the proximity of PP 110L to seat 519 as opposed to PP 110M. Similarly, power port identification program 400 infers that PP 110M will be utilized respect to seat 518, based on the proximity of PP 110M to seat 518.

In an example, power port identification program 400 determines that based on the battery charge status of user device 140A and 140B that supplemental text 528B associated with PP 110L, states "user device 140A battery level at 50%, est. charge time (using cable 161) 45 minutes (device inactive)/charge time 80 minutes (device active), and user device 140B battery level at 70%, est. charge time (using cable 162) 15 minutes." Whereas, power port identification program 400 determines based on the battery charge status of user device 140A and 140B that supplemental text 529B states "user device 140A battery level at 50%, est. charge time (using cable 161) 45 minutes (device inactive)-charge time 80 minutes (device active)" because power port identification program 400 determines that cable 162 is of insufficient length to reach PP 110M from seat 518. Alternatively, power port identification program 400 determines that cable 162 or cable 163 can be utilized to charge user device 140B by linking device 140B to 140A. In response, power port identification program 400 generates supplement text 529C that may state "user device 140A battery level at 50%, and user device 140B battery level at 70%, est. charge time (utilizing cables 161+162/163) 60 minutes (device 140A inactive)+charge time 25 minutes (device 140B active)" and "user device 140A battery level at 50%, and user device 140B battery level at 70%, est. charge time (utilizing cables 161+162/163) 120 minutes (device 140A active)+charge time 35 minutes (device 140B active)."

FIG. 6 depicts computer system 600, which is representative of server 130 and device 140. In an embodiment, computer system 600 is also representative of one or more instances of IoT device 112A through IoT device 112N. Computer system 600 is an example of a system that includes software and data 612. Computer system 600 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random-access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 612 are stored in persistent storage 605 for access and/or execution by one or more of the respective processor(s) 601 via cache 603 and one or more memories of memory 602. With respect to server 130, software and data 612 includes site information database 131, utilization data 133, IoT metadata 134, monitoring program 135, and other programs and data (not shown). With respect to an instance of user device 140, software and data 612 includes information 145, AR program 148, power port selection program 300, and power port identification program 400, UI 146, and other data and programs (not shown). With respect to instances of IoT device 112 software and data 612 includes metadata 114, and other data and programs (not shown). With respect to instances of input device 120 software and data 612 includes metadata 124, and other data and programs (not shown)

Communications unit 607, in these examples, provides for communications with other data processing systems or devices, including resources of server 130 and instances user device 140. In these examples, communications unit 607 includes one or more network interface cards. Communications unit 607 may provide communications, through the use of either or both physical and wireless communications links. Program instructions and data used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor. Display 609 can also function as a touch screen, such as the display of a tablet computer or a smartphone. Alternatively, display 609 displays information to a user based on a projection technology, such as virtual retinal display, a virtual display, or image projector.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for locating and identifying an electrical power port, the method comprising:
   determining, by one or more computer processors, that a battery respectively associated with at least one electronic device of a user is less than fully charged;
   identifying, by one or more computer processors, one or more Internet-of-Things (IoT)-enabled electrical power ports within a proximity the user;
   receiving, by one or more computer processors, metadata respectively associated with the one or more IoT-enabled electrical power ports; and
   generating, by one or more computer processors, one or more augmented reality (AR) elements respectively associated with the one or more IoT-enabled electrical power ports based on the received metadata respectively associated with the one or more IoT-enabled electrical power ports.

2. The method of claim 1, wherein receiving the metadata respectively associated with the one or more IoT-enabled electrical power ports is based on one or more wireless communication technologies.

3. The method of claim 1, wherein received metadata respectively associated with an IoT-enabled power port includes an indication of a location of the IoT-enabled power port and a status related to an availability of electrical power within the IoT-enabled power port.

4. The method of claim 1, wherein received metadata respectively associated with an IoT-enabled electrical power port includes one or more capabilities selected from the group consisting of: one or more types of electrical power and corresponding electrical power connection types included in the IoT-enabled electric power port, a voltage rating corresponding to an electrical connection, a current rating corresponding to the electrical connection, a power rating corresponding to the electrical connection, and one or more features of the electrical power connection.

5. The method of claim 1, wherein generating the one or more AR elements respectively associated with the one or more IoT-enabled electrical power ports based on the received metadata further comprises:
   activating, by one or more computer processors, a camera included in a first electronic device of the user to obtain a live-video image of an area within the proximity of the user;
   generating, by one or more computer processors, AR overlays respectively associated with the one or more IoT-enabled power ports; and
   rendering, by one or more computer processors, the generated AR overlays respectively associated with the one or more IoT-enabled power ports within the obtained live-video image.

6. The method of claim 1, wherein generating an AR element respectively associated with an IoT-enabled electrical power ports based on the received metadata further comprises:
   determining, by one or more computer processors, a first AR element depiction related to status of an IoT-enabled power port; and
   determining, by one or more computer processors, a second AR element identifying one or more capabilities included in the IoT-enabled power port.

7. The method of claim 1, further comprising:
   determining, by one or more computer processors, a location corresponding to the user; and
   determining, by one or more computer processors, a location of an IoT-enabled power port based on information selected from the group consisting of: coordinates included within the received metadata respectively associated with the IoT-enabled power port, an ID respectively associated with the IoT-enabled power port and a floor plan that maps locations of IoT-enabled electrical power ports, and a portion of the floor plan within a visual range of the user based on the determined location corresponding to the user.

8. A computer program product for locating and identifying an electrical power port, the computer program product comprising:
   one or more computer readable storage media and program instructions stored on the one or more computer readable storage media, the program instructions readable/executable by one or more computer processors:
      program instructions to determine that a battery respectively associated with at least one electronic device of a user is less than fully charged;
      program instructions to identify one or more Internet-of-Things (IoT)-enabled electrical power ports within a proximity the user;
      program instructions to receive metadata respectively associated with the one or more electrical IoT-enabled power ports; and
      program instructions to generate one or more augmented reality (AR) elements respectively associated with the one or more IoT-enabled electrical power ports based on the received metadata respectively associated with the one or more IoT-enabled electrical power ports.

9. The computer program product of claim 8, wherein receiving the metadata respectively associated with the one or more IoT-enabled electrical power ports is based on one or more wireless communication technologies.

10. The computer program product of claim 8, wherein received metadata respectively associated with an IoT-enabled power port includes an indication of a location of the IoT-enabled power port and a status related to an availability of electrical power within the IoT-enabled power port.

11. The computer program product of claim 8, wherein received metadata respectively associated with an IoT-enabled electrical power port includes one or more capabilities selected from the group consisting of: one or more types of electrical power and corresponding electrical power connection types included in the IoT-enabled electric power port, a voltage rating corresponding to an electrical connection, a current rating corresponding to the electrical connection, a power rating corresponding to the electrical connection, and one or more features of the electrical power connection.

12. The computer program product of claim 8, wherein program instructions to generate the one or more AR elements respectively associated with the one or more IoT-enabled electrical power ports based on the received metadata further comprise:
   program instructions to activate a camera included in a first electronic device of the user to obtain a live-video image of an area within the proximity of the user;
   program instructions to generate AR overlays respectively associated with the one or more IoT-enabled power ports; and
   program instructions to render the generated AR overlays respectively associated with the one or more IoT-enabled power ports within the obtained live-video image.

13. The computer program product of claim 8, wherein program instructions to generate an AR element respectively associated with an IoT-enabled electrical power ports based on the received metadata further comprise:

program instructions to determine a first AR element depiction related to status of an IoT-enabled power port; and program instructions to determine a second AR element identifying one or more capabilities included in the IoT-enabled power port.

14. The computer program product of claim 8, further comprising:

program instructions to determine a location corresponding to the user; and program instructions to program instructions to determining, by one or more computer processors, a location of an IoT-enabled power port based on information selected from the group consisting of: coordinates included within the received metadata respectively associated with the IoT-enabled power port, an ID respectively associated with the IoT-enabled power port and a floor plan that maps locations of IoT-enabled electrical power ports, and a portion of the floor plan within a visual range of the user based on the determined location corresponding to the user.

15. A computer system for locating and identifying an electrical power port, the computer system comprising:

one or more computer processors;

one or more computer readable storage media; and program instructions stored on the computer readable storage media for execution by at least one of the one or more computer processors, the program instructions comprising:

program instructions to determine that a battery respectively associated with at least one electronic device of a user is less than fully charged;

program instructions to identify one or more Internet-of-Things (IoT)-enabled electrical power ports within a proximity the user;

program instructions to receive metadata respectively associated with the one or more IoT-enabled electrical power ports; and program instructions to generate one or more augmented reality (AR) elements respectively associated with the one or more IoT-enabled electrical power ports based on the received metadata respectively associated with the one or more IoT-enabled electrical power ports.

16. The computer system of claim 15, wherein receiving the metadata respectively associated with the one or more IoT-enabled electrical power ports is based on one or more wireless communication technologies.

17. The computer system of claim 15, wherein received metadata respectively associated with an IoT-enabled power port includes an indication of a location of the IoT-enabled power port and a status related to an availability of electrical power within the IoT-enabled power port.

18. The computer system of claim 15, wherein received metadata respectively associated with an IoT-enabled electrical power port includes one or more capabilities selected from the group consisting of: one or more types of electrical power and corresponding electrical power connection types included in the IoT-enabled electric power port, a voltage rating corresponding to an electrical connection, a current rating corresponding to the electrical connection, a power rating corresponding to the electrical connection, and one or more features of the electrical power connection.

19. The computer system of claim 15, wherein program instructions to generate the one or more AR elements respectively associated with the one or more IoT-enabled electrical power ports based on the received metadata further comprise:

program instructions to activate a camera included in a first electronic device of the user to obtain a live-video image of an area within the proximity of the user;

program instructions to generate AR overlays respectively associated with the one or more IoT-enabled power ports; and program instructions to render the generated AR overlays respectively associated with the one or more IoT-enabled power ports within the obtained live-video image.

20. The computer system of claim 15, wherein program instructions to generate an AR element respectively associated with an IoT-enabled electrical power ports based on the received metadata further comprise:

program instructions to determine a first AR element depiction related to status of an IoT-enabled power port; and program instructions to determine a second AR element identifying one or more capabilities included in the IoT-enabled power port.

\* \* \* \* \*